(12) United States Patent
Rathunde et al.

(10) Patent No.: US 9,071,511 B2
(45) Date of Patent: Jun. 30, 2015

(54) METHOD AND SYSTEM FOR TRAFFIC FLOW AND LINK MANAGEMENT USING DOMAIN NOTIFICATIONS

(75) Inventors: Dale Rathunde, Geneva, IL (US); Deepak Elandassery, Naperville, IL (US); William E. Barker, Geneva, IL (US)

(73) Assignee: 8631654 Canada Inc., Ottawa, Ontario (CA)

( * ) Notice: Subject to any disclaimer, the term of this patent is extended or adjusted under 35 U.S.C. 154(b) by 465 days.

(21) Appl. No.: 12/570,890

(22) Filed: Sep. 30, 2009

(65) Prior Publication Data

US 2011/0075662 A1    Mar. 31, 2011

(51) Int. Cl.
*H04L 12/24* (2006.01)
*H04L 12/703* (2013.01)
*H04L 12/413* (2006.01)
*H04L 12/939* (2013.01)

(52) U.S. Cl.
CPC ............ *H04L 41/0654* (2013.01); *H04L 45/28* (2013.01); *H04L 12/413* (2013.01); *H04L 49/555* (2013.01); *H04L 49/557* (2013.01)

(58) Field of Classification Search
None
See application file for complete search history.

(56) References Cited

U.S. PATENT DOCUMENTS

| | | | |
|---|---|---|---|
| 7,127,637 B2 * | 10/2006 | Rathunde et al. | 714/10 |
| 2002/0073338 A1 * | 6/2002 | Burrows et al. | 713/201 |
| 2004/0062209 A1 * | 4/2004 | Goldman et al. | 370/256 |
| 2005/0257213 A1 * | 11/2005 | Chu et al. | 717/170 |

\* cited by examiner

*Primary Examiner* — Jason Mattis
(74) *Attorney, Agent, or Firm* — Volpe and Koenig, P.C.

(57) ABSTRACT

A system allowing for path monitoring and notification in a system of switching elements and processing elements is provided. An exemplary technique uses a monitoring and notification module configured to generate and output monitoring messages across multiple paths defined by the plurality of switching elements and the plurality of processing elements, detect a fault in the system based on the monitoring messages, and generate and output multiple alert messages across the multiple paths to initiate recovery from the fault As such, a single element (or group of elements) does not become isolated from the rest of the elements in the system.

22 Claims, 6 Drawing Sheets

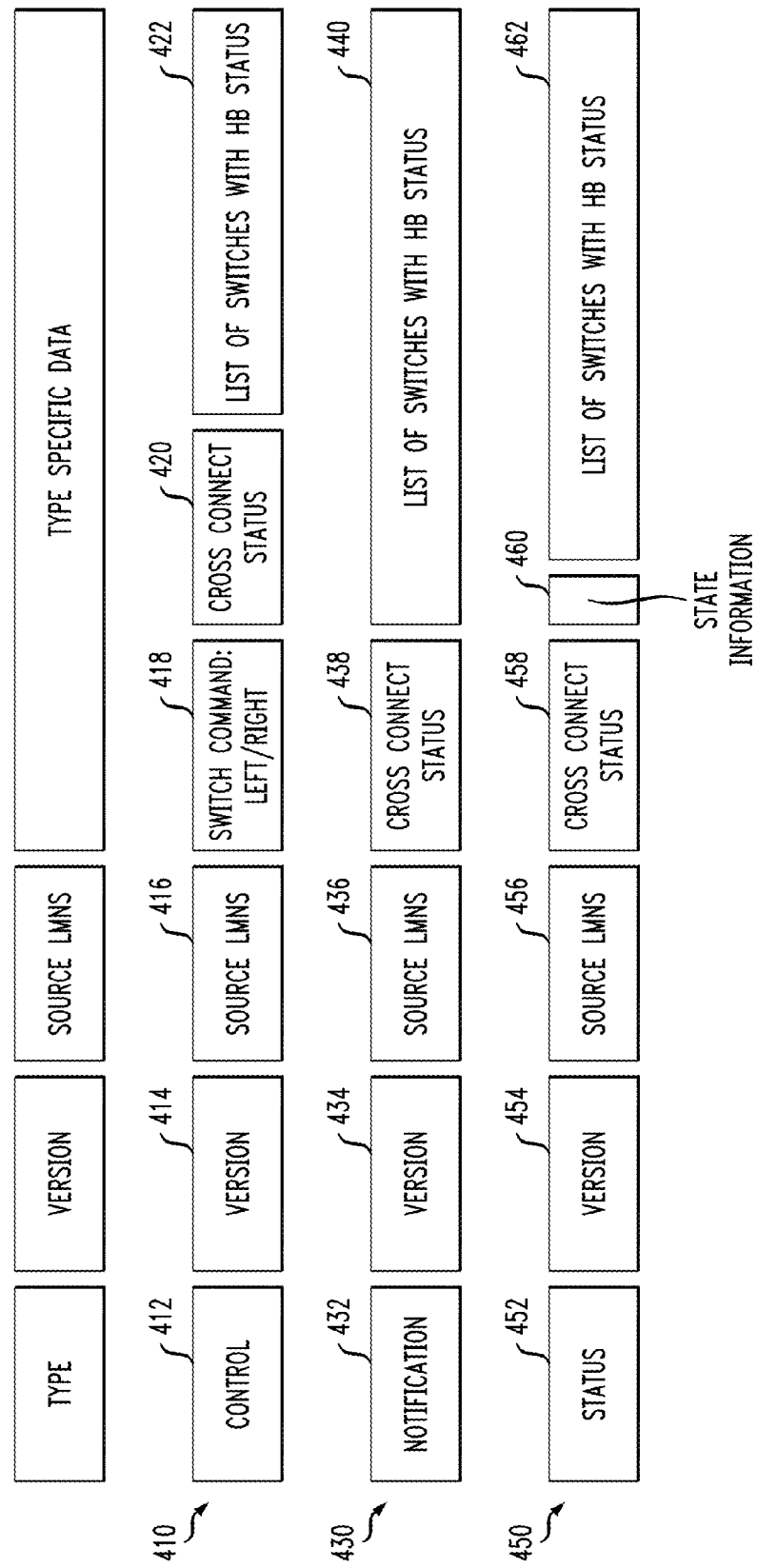

METHOD AND SYSTEM FOR TRAFFIC FLOW AND LINK MANAGEMENT USING DOMAIN NOTIFICATIONS

FIELD OF THE INVENTION

This invention relates to a method and system for traffic flow and link management using domain notifications.

BACKGROUND

Standards such as STP (Spanning Tree Protocol) and RSTP (Rapid STP) address automatically disabling and re-enabling links to manage traffic flow (e.g. prevent undesired loops).

In prior efforts, platforms used STP, RSTP, Virtual Router Redundancy Protocol (VRRP) or other Layer 2 (L2) Management Protocols to detect a fault, and then control the traffic flow recovery in a switch network attached to one or more processing elements. This is typically applied at the switch level where local link faults can be detected, usually via an Internet Control Message Protocol (ICMP) heartbeat mechanism over a link or link integrity failure. These approaches rely on disabling unneeded links and re-enabling links when needed to control traffic flow. However, the recovery is slow, involves outages and is limited to link control only on the switches.

In other approaches, a single central function (e.g. a master instance) is used to collect, count and threshold local link events to perform traffic flow recovery on a pair of switches.

Thus, a redundant monitoring technique is needed that operates across rack-based or shelf-based processing communication elements to monitor link paths and to perform notifications to trigger self-healing (auto repair) of local ports on all processing nodes in the system to maximize system availability.

SUMMARY

Unplanned downtime in any network is less than desirable. A major contributor to unplanned downtime is a lack of Local Area Network (LAN) fault coverage. In this regard, the ability to isolate and recover from network faults is a need of network and end users (e.g. customers) and a major differentiator in the telecom market.

As Mobile Switching Center (MSC) and Internet Service Provider (ISP) networks evolve with many rack mounted servers and Advanced Telecommunications Computing Architecture (ATCA) chassis processing solutions, elimination of unplanned downtime due to split LANs and split processing clusters is also desirable. Thus, it would be beneficial to perform LAN fault management between commercial elements in a running system.

However, STP and RSTP do not handle partial failures and do not address notifications to distributed processing elements in the network. In addition, they do not posses system-wide knowledge of the network topology.

Conventional approaches fail to provide notifications to processing elements, such as nodes, in the same network, nor do they allow for recovery involving "multiple switch" configurations (e.g., when multiple processing racks or shelves are used) where a critical link path or cross-connection path is down. Also, port recovery of all components in a system of processing elements is needed. The known systems simply do not integrate any protocols on processing nodes in the LAN that are needed to trigger local node link recovery so self-healing (auto repair) operations on all processing elements, such as nodes, in the same distributed system can be initiated.

Accordingly, a method and apparatus for traffic flow and link management are provided.

In one embodiment, a system comprises a plurality of switching elements, a plurality of processing elements associated with the plurality of switching elements, and a monitoring and notification module configured to generate and output monitoring messages across multiple paths defined by the plurality of switching elements and the plurality of processing elements, detect a fault in the system based on the monitoring messages, and generate and output multiple alert messages across the multiple paths to initiate recovery from the fault.

In another embodiment, the monitoring and notification module resides on at least one of the plurality of processing elements.

In another embodiment, the monitoring and notification module resides on at least one of the plurality of switching elements.

In another embodiment, the monitoring and notification module is further configured to generate and output control messages.

In another embodiment, the monitoring and notification module is further configured to generate and output status messages.

In another embodiment, the monitoring messages are heart beat messages.

In another embodiment the monitoring messages are Simple Network Management Protocol (SNMP) messages.

In another embodiment, the system further comprises an event receiving module on at least one of the plurality of processing elements.

In another embodiment, the system further comprises an event receiving module on at least one of the plurality of switching elements.

In another embodiment, a method comprises generating and outputting monitoring messages across multiple paths in the network, detecting a fault in the network based on the monitoring messages and generating and outputting multiple alert messages across the multiple paths to initiate recovery from the fault.

In another embodiment, the method is implemented on a processing element.

In another embodiment, the method is implemented on a switching element.

In another embodiment, the method further comprises generating and outputting control messages.

In another embodiment, the method further comprises generating and outputting status messages.

In another embodiment, the monitoring messages are heart beat messages.

In another embodiment, the monitoring messages are SNMP messages.

In another embodiment, the method further comprises listening through an event receiving module on at least one of the plurality of processing elements.

In another embodiment, the method further comprises listening through an event receiving module on at least one of the plurality of switching elements.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 4 is a representation of various alert formats according to the presently described embodiments.

DETAILED DESCRIPTION

Figure 1:
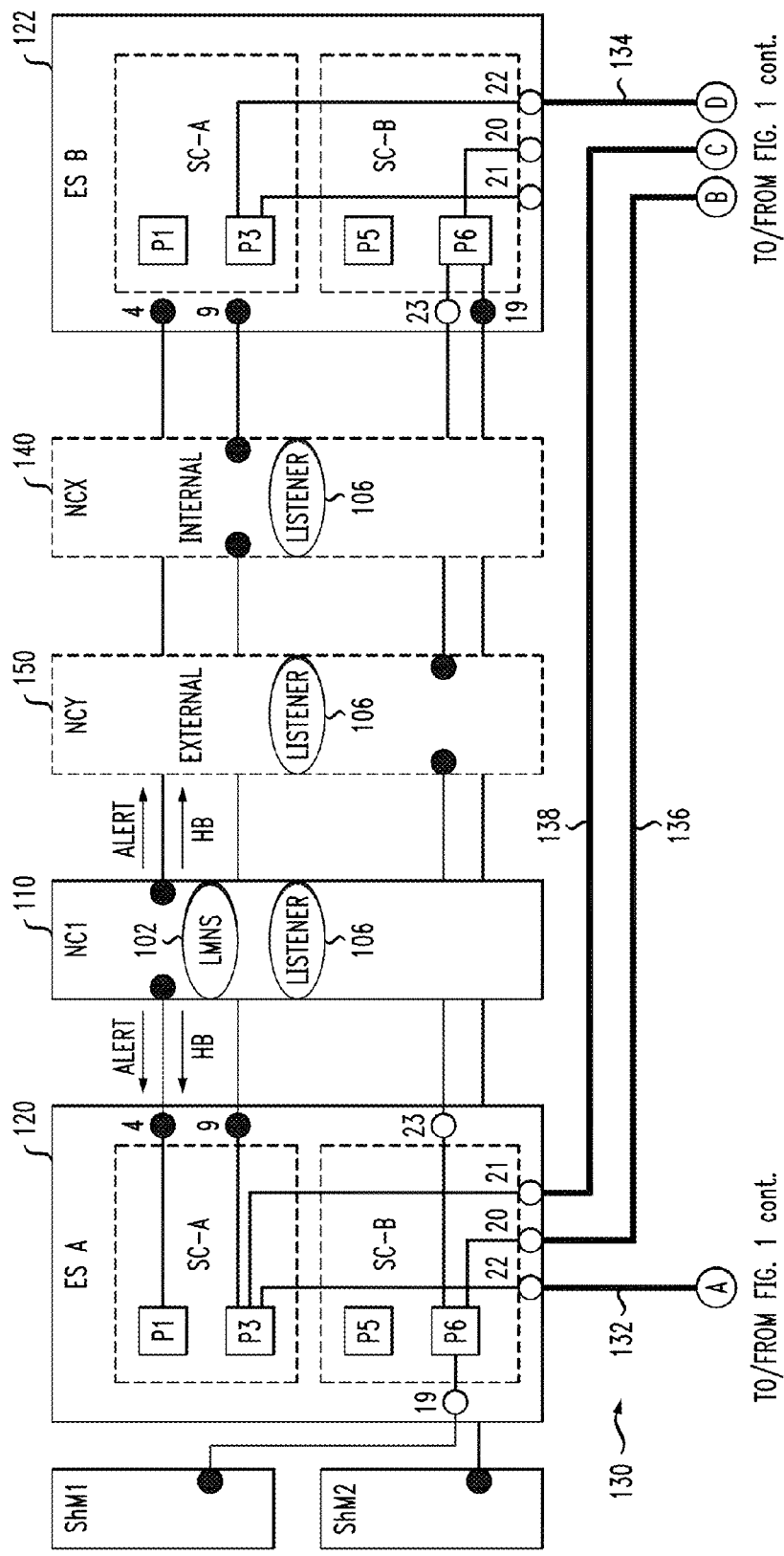
FIG. 1 is a block diagram of a system incorporating the features of the presently described embodiments.
Figure 1:
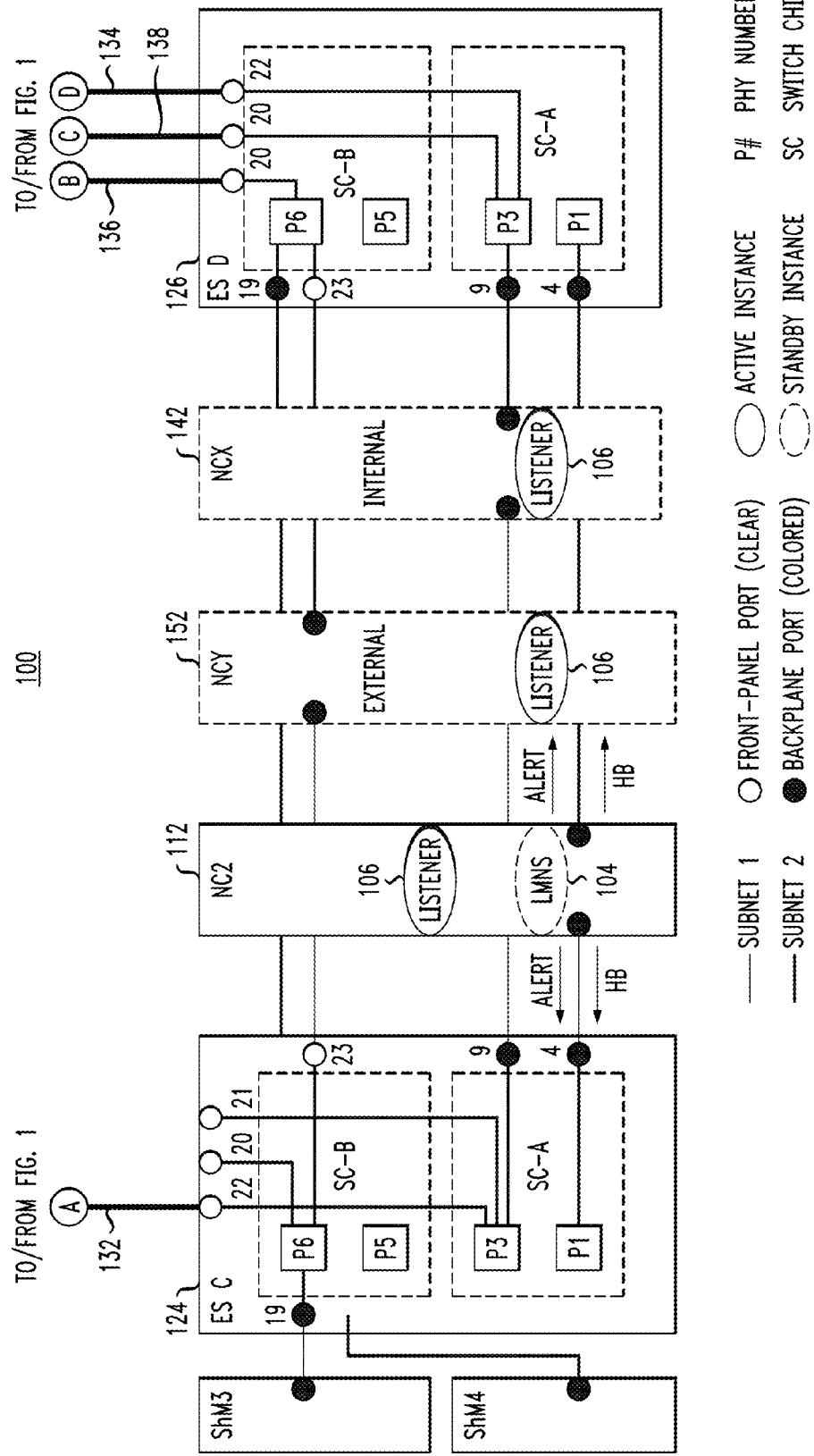

A method and apparatus allowing for path, e.g. LAN, monitoring and, e.g. LAN, notification messages/events in a system of networked processors are provided. The subject technique uses multiple monitoring instances and local event receivers (or listeners or receiving modules) to provide for local link/port recovery on impacted processing elements. This monitoring and notification technique uses redundant multi-directional messages, such as heartbeat messages, across multiple paths between switches and uses multi-cast, broadcast or IP packet messages to send control data/logic to drive appropriate local link recovery on each of the processing nodes in the same system. This mechanism uses a control (i.e., alert message) to notify processing elements (running any operating system (OS)) to recognize that a link recovery is needed on one of its local redundant ports to maintain communication with the entire community of processing elements. As such, a single processing element, such as a node, (or group thereof) does not become isolated from the rest of the processing elements in the system.

This approach allows for event distribution across multiple racks, frames, shelves to exist in the same system and allows for each rack, frame or shelf to monitor their own path between switch components and/or network elements. In this way, failures are identified and notification is sent to the system to ensure system wide communication, even when the failure is not detected by other parts of the system.

In at least one embodiment, each processor (e.g. switch or node processor) running the LAN monitoring and notification function communicates over standard IP interfaces to hardware and software components (e.g., using SNMP, Transmission Control Protocol/Internet Protocol (TCP/IP), User Datagram Protocol/Internet Protocol (UDP/IP), Address Resolution Protocol (ARP), ICMP, etc.) in the same system. Monitored components have local fault monitoring capabilities that can report directly or indirectly to the monitoring and notification functions. Software (on all nodes in the same network) can receive notification messages from one or more monitoring and notification functions.

In at least one form, general switches and/or routers are connected to allow for message passing between processors on the same network. High Availability (HA) software on the processors (e.g. switch or node processors) running the monitoring and notification software is used for redundancy of the monitoring and notification software (e.g., to manage active and standby instances of the monitoring and notification software).

According to at least some of the presently described embodiments, a single pair of monitoring and notification functions, or multiple instance pairs of monitoring and notification functions, co-exist in a system for monitoring different LAN topologies with different interconnection schemes (simple or complex). A single pair or multiple pairs of monitoring and notification functions operate from switch cards or node processing cards (connected to switch cards), depending on traffic link/path failure detection and recovery time needs. Thus, running on switch cards can yield the fastest detection and recovery time performance. Recovery of components in a system include but are not limited to: control and user (traffic) plane processing cards, fabric switching cards (e.g., Ethernet, Fibre Channel, Infinity Band, etc,), chassis management cards (e.g., standard Hardware Platform Interface (HPI) Shelf Managers (ShM) in ATCA systems), Carrier Cards (doing I/O processing), etc.

The approach according to the presently described embodiments enables local error/fault recovery to be performed on each processing element using events from one or multiple LAN monitoring and notification sources, while allowing a given processing element or node to have responsibility for local recovery (e.g., Virtual LAN (VLAN) switchover, IP failover, port up/down, etc) of its own set of hardware resources/components.

The subject LAN monitoring and notification method can be applied in systems with time-share and real-time operating systems, commercial processors, embedded processors, commercial chassis systems (single and multiple shelf), as well as high availability and clustered solutions and other client-server architectures interconnected with commercial switches. This method is highly adaptable in nature and can be part of switch software (like VRRP is), high availability software, system management software, geo-redundancy IP networks, or operating system software as the industry evolves.

The presently described embodiments relate to platforms designed to support network services across multiple processing elements, including, but not limited to, call processing and radio control software, particularly, UMTS, 1×CDMA, 1×EV-DO, GSM, WiMAX, UMB, LTE, etc., and software dispersed over several mobility application processors in the wireless access network architecture. It can also relate to IMS service processor solutions for 3G and 4G networks.

Figure 2:
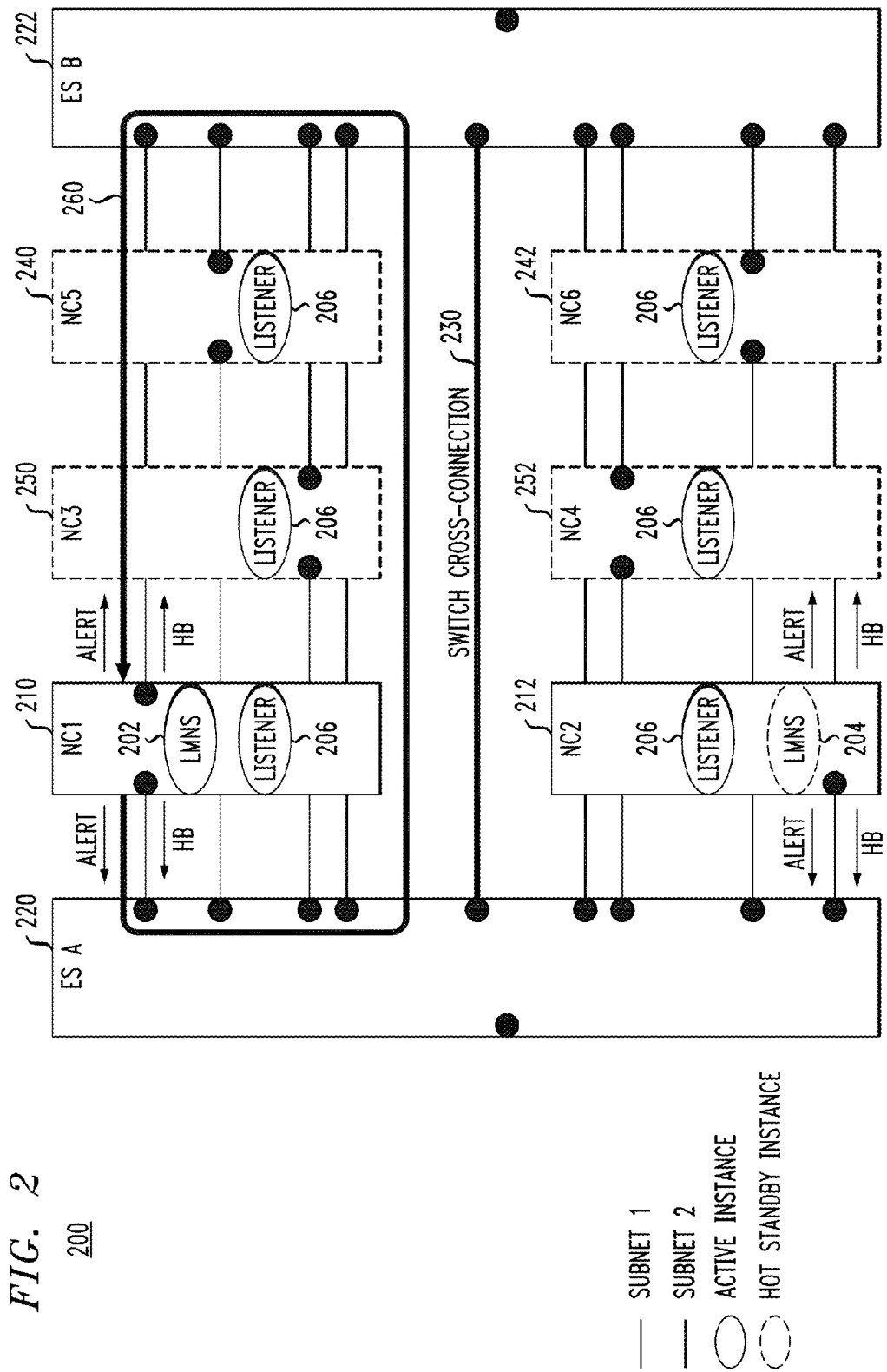
FIG. 2 is a block diagram of a system incorporating the features of the presently described embodiments.
Figure 3:
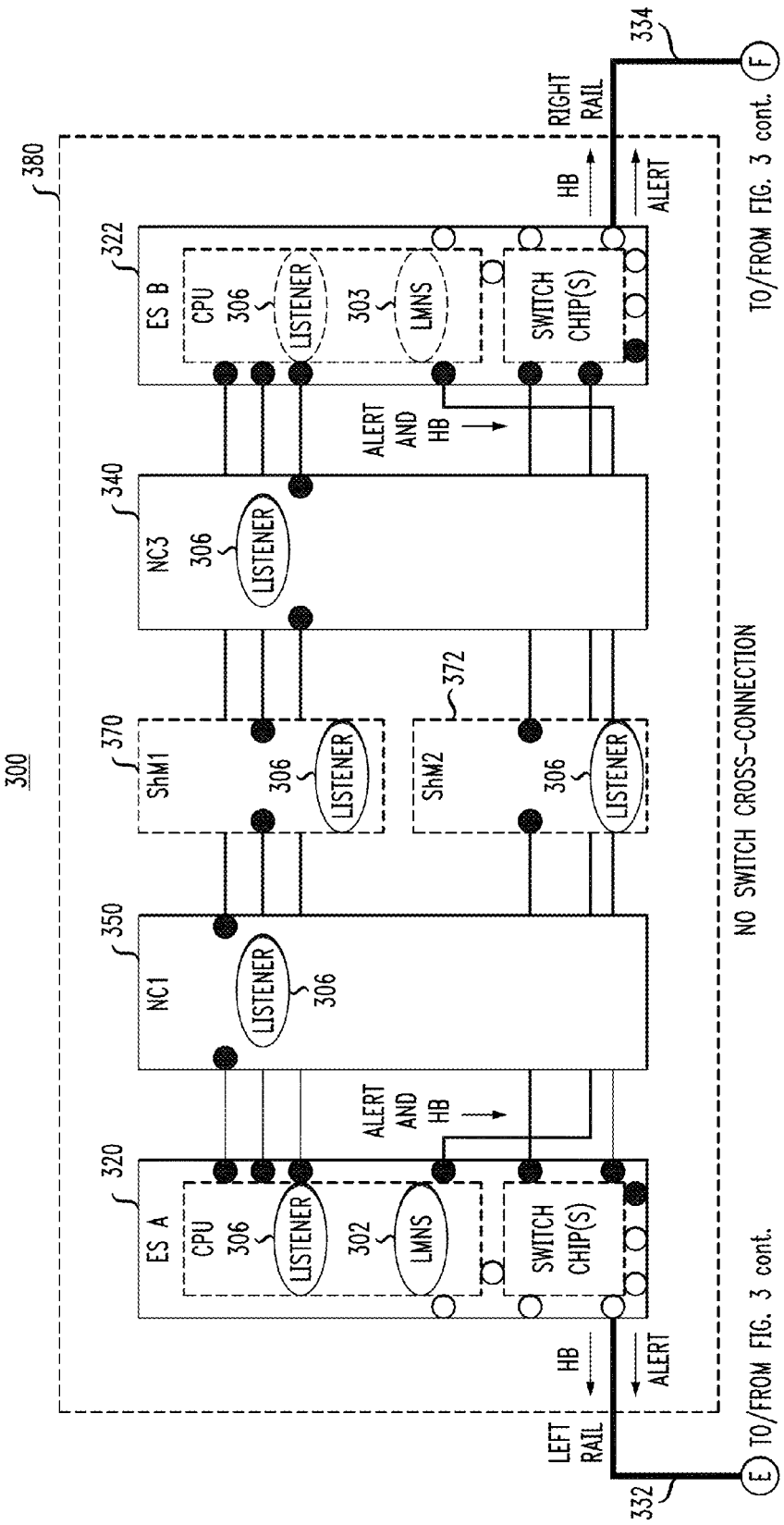
FIG. 3 is a block diagram of a system incorporating the features of the presently described embodiments.
Figure 3:
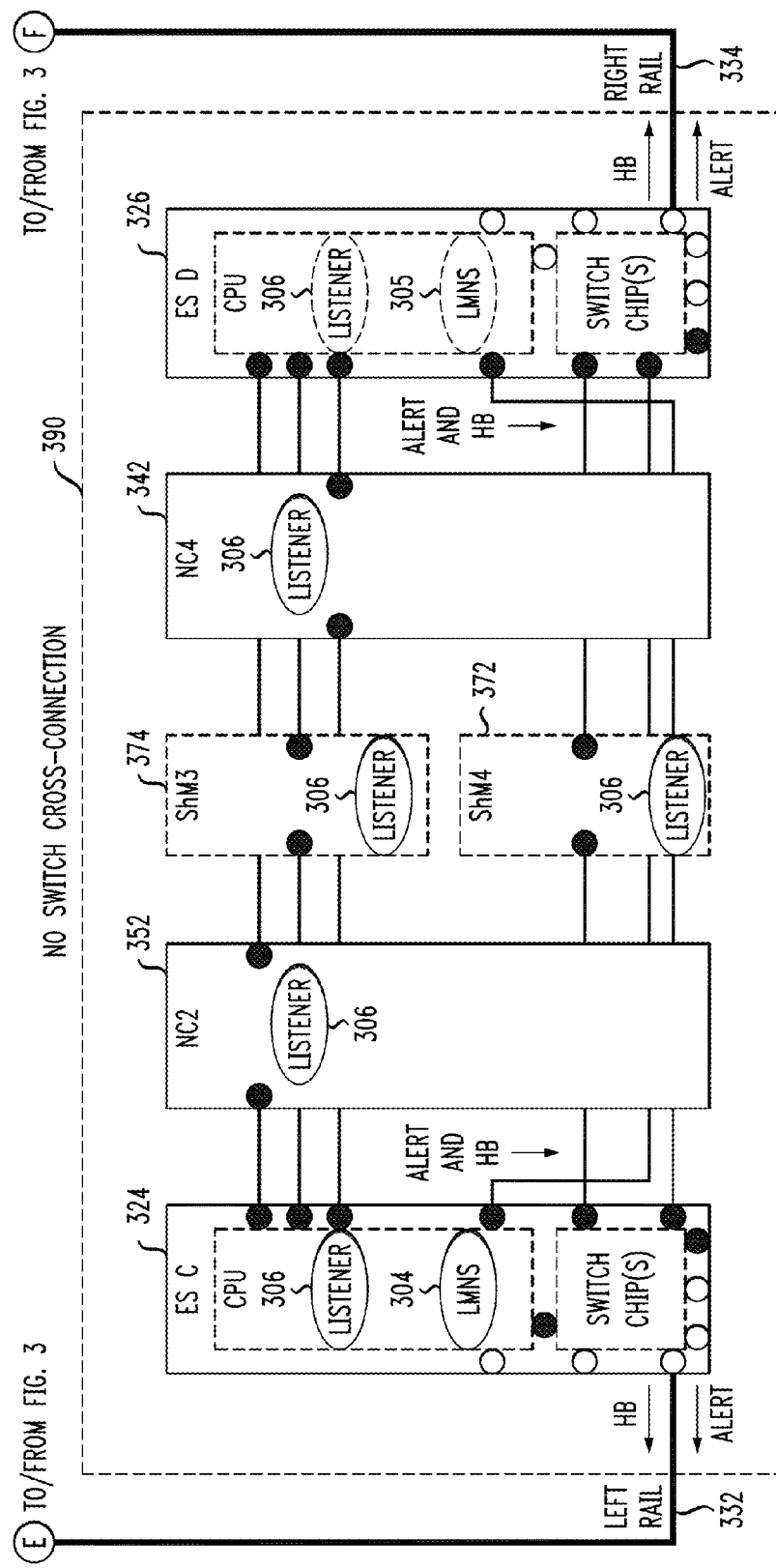

FIGS. 1-3 illustrate the example use of the LAN Monitoring and Notification Software (LMNS) used in three example platform product configurations (e.g. a compact PCI Packet Switched Backplane (cPSB) configuration such as that of Alcatel-Lucent Flexent Blade Platform (FBP), a compact Peripheral Component Interconnect (cPCI) configuration such as that of Alcatel-Lucent Flexent Mobility Server (FMS) and an ATCA configuration, respectively). The presently described embodiments are thus intended to support the development of wireless networks using cPSB, cPCI, ATCA and next generation platforms and to apply to IP over Ethernet. LMNS can use generic mechanisms such as ICMP ping or ARP to monitor (heartbeat) switches, shelf/frame interconnection and switch cross-connection. This monitoring approach can resolve Split LAN detection issues in a Radio Network Controller (RNC) frame when Ethernet Switch with Rail (shelf interconnection) or switch cross-connection fails or cross-connection port/cable fails and facilitates recovery of both control and traffic processing node cards in the same system.

In all example LMNS configurations shown in FIGS. 1-3, LMNS resides on a pair of processing elements (e.g. switches or other processing elements such as nodes) and can monitor the switching elements such as Ethernet Switches, interconnections and switch cross-connection (if configured) in the system. In operation, in each example configuration:

- If a switching element such as an Ethernet switch fails, all active nodes (including those in other shelves and connected via remote switches) will be notified, via a listener, to switch traffic (configuration) to the other port side (e.g. the node may switch IP addresses or switch VLAN on board to reconfigure ports).
- If a switch cross-connection fails, all active processing elements will be notified to switch IP addresses to the same side.
- If a shelf interconnection (rail) fails, all active processing elements will be notified to switch IP addresses to the same side.
- If the LAN failure is not promptly repaired, the notification continues to allow the processing elements to switch to the correct port side. This is a benefit to network processing elements that reboot.
- Alert notification messages can be broadcast or multi-cast type message to propagate regardless of subnet on ports.
- Alert notification messages can be sent to control traffic flow for manual operations (for planned maintenance on a system).

In one form, the LMNS monitoring approach works on Linux and VxWorks switch cards and is based on using ICMP or ARP type messages. The LMNS creates the ARP packets. The ARP-beating mechanism provides the ability to monitor connectivity to a network element on the LAN with redundant HB strategy (to two distinct end-points) by periodically polling its destination using a standard ARP. The ARP request used for LMNS is typically a unicast message whereby the target successfully returns an ARP reply. However, when the first ARP request is sent by LMNS (e.g., when a link comes up), the destination MAC associated with the unique IP is unknown. In this case, a broadcast ARP request is sent by LMNS with the destination IP. This approach can be integrated with existing network protocols and any application heartbeating software.

The LAN monitoring and notification software can provide active polling (e.g. heartbeating) of any Ethernet switch configuration. That is, each switch (or node) running the LMNS can heartbeat with connected Ethernet Switches (if configured to do so) and can notify all processing elements in any L2 domain associated with a notification port on that element.

To support port recovery on the processing nodes, multiple ports/paths are used for the Alert notification message. This allows the notification message to be received regardless of a single port failure or which side/port the active subnet is on. Under normal operating conditions, the Alert notification will be sent on the side of the failure. However, when the other LMNS instance is off-line or the switch cross-connection fails (or not configured), the Alert notification will be sent on multiple ports. The use of a multi-cast or broadcast message approach supports notification to processing nodes configured in independent clusters (in the same or different frame) on the same LAN. So, it is independent of cluster boundaries and cluster software.

Referring specifically now to the drawings wherein the showings are for purposes of illustrating the exemplary embodiments only and not for purposes of limiting the claimed subject matter, FIG. 1 provides a view of a system into which the presently described embodiments may be incorporated. FIG. 1 shows a system 100 including LMNS 102,104 running on processing elements 110, 112 across multiple shelves—whereby switching elements 120, 122, 124 and 126 (e.g. Ethernet switching elements) are used in a RNC Network Configuration (with a cross-connection 130).

The cross-connection 130 includes rails 132 and 134, as well as diagonal dual lines 136 and 138. Processing elements, such as nodes, connected to switches can be internal (such as 140, 142 in the same shelf) or external (such as 150, 152 in another shelf or frame). Here, LMNS 102 is used to monitor Ethernet switches on the left side (A side), as well as switches on the right side (B side), in the same L2 domain. A Heartbeat (HB) mechanism is shown but any network management protocol such as SNMP, or other monitoring protocols, may be used for monitoring (and, as such, the monitoring messages may be based on any such protocol). Switching elements, or nodes have at minimum two ports (port 0 and port 1). Here, LMNS can also be used to monitor uplinks from a switch to customer network and control link up/down conditions and send Alert notification message to control traffic flow in the system. In addition, LMNS can accomplish link monitoring using heart beat messages or SNMP.

The LMNS scheme contemplated is based on direct connection between the processing elements, such as nodes, and switching elements such as Ethernet Switches in the shelf (e.g., this configuration is common for both internal and external processing elements). The Alert Listener software 106, also referred to as an event receiving module, on the processing elements may also be connected to the switching elements, e.g. Ethernet switches where desired. The event receiving module may also reside on the switching elements. The only difference between the internal processing element and external processing element connectively is which physical switch port (number) on the switch is used to connect to the processing node.

As can be seen in FIG. 1, in operation, the LMNS 102, 104 uses (e.g. generates and outputs) redundant multi-directional monitoring messages, such as heartbeat messages HB, across multiple paths (defined by the processing elements and switching elements) between switches. Faults in the network are detected based on the monitoring messages. LMNS 102, 104 also use (e.g. generates and outputs) multi-cast, broadcast or IP packet messages to send control data/logic to drive appropriate local link recovery on each of the processing nodes in the same system. In this regard, the system uses a control (e.g. multiple alert messages) to notify processing elements (running any OS) to recognize that a link recovery is needed on one of its local redundant ports to maintain communication with the entire community of processing elements. As such, a single processing element (or group of processing elements) does not become isolated from the rest of the processing elements in the system.

Referring now to FIG. 2, another configuration is shown. A system 200 includes an LMNS 202, 204 running on processing elements or nodes 210, 212 across multiple shelves whereby only two central switches, or switching elements, 220, 222 are used in an RNC Network Configuration (with a cross-connection 230). Here, LMNS is used to monitor one switch 220 (e.g. an Ethernet switch) on the left side as well as one switch 222 (e.g. and Ethernet switch) on the right side in the same L2 domain. Also shown in FIG. 2 are processing elements 240, 242, 250 and 252. Listeners, or event receiving modules, 206 are also shown.

The LMNS scheme is based on direct connection between the processing nodes and two switching elements, e.g. central Ethernet Switches in the system (e.g., this configuration is common for both 1×CDMA and 1×EV-DO RNCs). An added monitoring message such as heart beat HB, over the cross-connection is sent from and to the LMNS processing element, such as a node, as shown on path 260. The Alert Listener software, or event receiving modules, 206 on the processing element may also be connected to the Ethernet switches where desired. In a configuration whereby the base frame Ethernet switches have the cross-connection and additional growth frames are connected in a star topology to the base frame switches, this LMNS is expandable to support multiple frame configurations.

Again, in operation, the LMNS 202, 204 uses redundant multi-directional monitoring messages, such as heartbeat messages HB, across multiple paths between switches. Faults in the network are detected based on the monitoring messages. LMNS 202, 204 also use (e.g. generates and outputs) multi-cast, broadcast or IP packet messages (e.g. multiple alert messages) to send control data/logic to drive appropriate local link recovery on each of the processing nodes in the same system. As such, a single processing element (or group of processing elements) does not become isolated from the rest of the processing elements in the system. Here, LMNS can also be used to monitor uplinks from a switch to customer network and control link up/down conditions and send Alert notification message to control traffic flow in the system. In addition, LMNS can accomplish link monitoring using heart beat messages or SNMP.

FIG. 3 shows a system 300 including LMNS 302, 304 running on switch cards on separate shelves 380 and 390. Also shown are standby LMNS 303 and 305. In some forms, multiple shelves (e.g. 2 or 3) in a frame are used in an RNC Network Configuration (without central cross-connection). Here, LMNS 302, 304 is used to monitor switches 320, 324 (e.g. Ethernet switch) on the left side as well as switches 322, 326 (e.g. Ethernet switch) on the right side in separate L2 domains. Rails 332 and 334 are also shown. The example configuration 300 also illustrates processing elements 340, 342, 350, 352 and other shelf elements 370, 372, 374 and 376. Alert listener software, or element receiving modules, 306 are also implemented if desired.

It should be appreciated that switching elements contemplated herein generally include switch chips and processors. For ease of explanation, these elements are not specifically delineated in FIGS. 1 and 2. However, in FIG. 3, the LMNS is run on the switching elements shown. Accordingly, in at least one form, the LMNS is run on processors of these switching elements that are capable of running a variety of routines including (LMNS)—as opposed to being run on the switch chips.

The LMNS scheme is based on direct connection between the processing nodes and two switching elements, e.g. Ethernet Switches in each shelf (e.g., this configuration is common for both ATCA projects and Next-Generation 1×EV-DO and UMTS RNCs). The Alert Listener software, or event receiving modules, 306, on the processing node may also be connected to the shelf Ethernet switches. The Ethernet switches on each shelf are connected in a daisy-chain (no switch cross-connection) whereby the left LAN (L2 domain) is completely isolated from the right LAN (L2 domain).

Here, LMNS can also be used to monitor uplinks from a switch to customer network and control link up/down conditions and send Alert notification message to control traffic flow in the system. In addition, LMNS can accomplish link monitoring using heart beat messages or SNMP.

An example will help illustrate the recovery needed in a multiple shelf system. As above, monitoring messages are generated and output by the LMNS. If the loss of a monitoring message, such as heart beat HB, is detected (e.g. a fault is detected based on the monitoring message) for an Ethernet switch or Ethernet Rail between shelves, all active processing elements on multiple shelves that receive notification will switch active subnets to the other port side or an appropriate port. After a switchover is performed to the other port side or an appropriate port because of an Ethernet switch, Rail or even uplink related failure, LMNS notification will not allow switch back until the Ethernet switch, Rail or uplink failure is cleared.

FIG. 4 illustrates example LMNS alert message types used in the three example platform product configurations detailed above (e.g. cPSB, cPCI and ATCA). In general, and as shown as a mere example, the format of the message types includes a type field for identifying the type of message (e.g. control, notification or status), a software version field, a source field identifying whether the source is an active LMNS or a standby LMNS, and a data field (the contents of which may vary). In this regard, as mere examples, support for generation and distribution of the following alert message types may be provided:

A control alert 410 includes, in at least one form, a type field 412, a version field 414, a source field 416, and data fields including command field 418, cross-connect status field 420 and switch heartbeat status field 422. LMNS will perform event correlation based on other event conditions to determine when to send this alert. The alert message is written on one or both network interfaces to communicate the need to switch the active LAN to the appropriate side or appropriate port through command field 418, for example.

A notification alert 430 is affected by, in at least one form, switch heartbeat status and LMNS source. The notification alert 430, in one form, includes a type field 432, a version field 434, a source field 436 and data fields including cross-connect status field 438 and heartbeat status field 440. This alert provides a mechanism for the standby LMNS to notify the active LMNS of certain failures, so that the Active LMNS can differentiate loss of rail from loss of switch on the shelf where the standby LMNS is running. It can also be used to notify other Active LMNS of switch status (e.g., in the case of a loss of a single rail between shelves, LMNS uses the switch status to determine if loss of rail should be alarmed or not).

A status alert 450, written on both LAN interfaces, indicates that the LMNS Alert Generator is sending alerts. This alert can be used by a receiver to validate the communication path between itself and the Alert Generator. The status alert 450, in one form, includes a type field 452, a version field 454, a source field 456, and data fields including a cross-connect status field 458, a state information field 460 and a heartbeat status field 462. It should be appreciated that the state information field 460 includes, in one form, LMNS state information and hardware state information.

It should be appreciated that the format or order of the data in these alert messages can change, but still remain within the scope of the invention, and parsing can be accomplished by one skilled in the art. Having different alert messages provides the flexibility to easily make adjustments to these structures in the future if it is discovered that additional information is needed, or some data needs to be removed. The alert structure format also provides flexibility for adding additional alert types if needed in the future.

The alert message, in one form, is sent with key value pairs, so the order is not important and parsing is easier.

Implementation of the presently described embodiments results in increased value and/or advantageous benefits. These include:

LAN management in a multi-switch environment, where failure of cross-connects, rails, and uplinks are undetectable by some nodes and therefore requires a system-wide LAN recovery approach.

Notification method to allow the receiving processing elements to perform local port IP address or VLAN port recovery to maintain traffic flow (communication). Such notification to other network processing elements is not covered by standard methods and protocols.

Fast notification, e.g. only a few hundred milliseconds in a properly configured network.

Prevention of split LAN and split High Availability clusters problems in multiple shelf and multiple frame system configurations when network fault is not seen by nodes in adjacent shelf.

Multi-directional monitoring of Ethernet switches to detect switch failure versus single port failure detection.

Ability for one or more monitoring and notification functions to operate in parallel in the same LAN on same or different shelves.

Faster coordinated LAN recovery operations across distributed processing nodes. A major contribution to unplanned downtime is lack of LAN fault coverage. The ability to isolate and recover faults is a customer need and a major differentiator in the telecom market. This solution provides ability to monitor a large multi-switch network topology and recover it.

In addition, the presently described embodiments can be implemented in UNIX, Linux, VxWorks and other OS software. The complete embodiments implement High Availability (HA) software that supports recovery of processes used for the monitoring and notification functions. The use of multiple monitoring and notification instances within a community of processing elements in the same system is unique and not prior art.

The invention may be implemented using a variety of hardware configurations and software routines. In this regard, it should be appreciated that block diagrams and the like represent various processes which may be substantially represented in computer readable medium and so executed by a computer or processor configured or operative to so execute, whether or not such a computer or processor is explicitly shown. For example, routines may be run by processors of a switching element, such as an Ethernet switch, or a processing element to perform functions described herein. Also, Ethernet switches are used as an example switching element in this description; however, other types of switching elements may be used.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A system comprising:
a plurality of switching elements connected over a plurality of paths;
a plurality of processing elements, a processing element of the plurality of processing elements connected to at least one of the plurality of switching elements; and
a monitoring and notification module configured to:
generate and output monitoring messages across the plurality of paths;
detect a fault in the system based on the monitoring messages;
determine that the fault is due to a switching element failure;
and generate and output alert messages across the plurality of paths to trigger the plurality of processing elements to perform recovery from the fault;
wherein the plurality of processing elements are configured to selectively switch operation to a port side that is unaffected by the switching element failure based on the alert messages without controlling the plurality of switching elements.

2. The system as set forth in claim 1 wherein the monitoring and notification module resides on at least one of the plurality of processing elements.

3. The system as set forth in claim 1 wherein the monitoring and notification module resides on at least one of the plurality of switching elements.

4. The system as set forth in claim 1 wherein the monitoring and notification module is further configured to generate and output control messages.

5. The system as set forth in claim 1 wherein the monitoring and notification module is further configured to generate and output status messages.

6. The system as set forth in claim 1 wherein the monitoring messages are heart beat messages.

7. The system as set forth in claim 1 wherein the monitoring messages are network management protocol-based.

8. The system as set forth in claim 1 further comprising an event receiving module on at least one of the plurality of processing elements.

9. The system as set forth in claim 1 further comprising an event receiving module on at least one of the plurality of switching elements.

10. The system as set forth in claim 1, wherein the monitoring and notification module includes local area network (LAN) monitoring and notification software (LMNS) residing in at least one of the plurality of processing elements.

11. The system as set forth in claim 10, wherein the alert messages indicate that the fault is due to the switching element failure.

12. The system as set forth in claim 1, wherein the alert messages are broadcast messages or multicast messages, and further wherein the alert messages propagate regardless of a subnet on ports of the plurality of processing elements.

13. A method implemented in a network having a plurality of switching elements and a plurality of processing elements, the method comprising:
generating and outputting monitoring messages across a plurality of paths in the network;
detecting a fault in the network based on the monitoring messages;
determine that the fault is due to a switching element failure;
generating and outputting alert messages across the plurality of paths to trigger at least one of the plurality of processing elements to perform recovery from the fault; and
the plurality of processing elements selectively switching operation to a port side that is unaffected by the switching element failure based on the alert messages without controlling the plurality of switching elements.

14. The method as set forth in claim 13, wherein the generating and outputting monitoring messages, the detecting the fault, and the generating and outputting alert messages are implemented by a local area network (LAN) monitoring and notification software (LMNS) residing in at least one of the plurality of processing elements.

15. The method as set forth in claim 14, wherein the alert messages indicate that the fault is due to the switching element failure.

16. The method as set forth in claim 13, wherein the alert messages are broadcast messages or multicast messages, and further wherein the alert messages propagate regardless of a subnet on ports of the plurality of processing elements.

17. A system comprising:
a plurality of switching elements connected over a plurality of paths;
a monitoring and notification module configured to:
generate and output monitoring messages across the plurality of paths;
detect a fault in the system based on the monitoring messages;
determine that the fault is due to one of a shelf interconnection failure and a switch cross-connection failure; and
generate and output alert messages across the plurality of paths; and
a plurality of processing elements configured to perform a local port Internet protocol (IP) address recovery based on the alert messages.

18. The system of claim 17, wherein the monitoring and notification module is further configured to notify the plurality of processing elements to switch Internet protocol (IP) addresses to a same port side.

19. The system of claim 18, wherein the plurality of processing elements are further configured to switch IP addresses to the same port side responsive to the notification from the monitoring and notification module.

20. A method implemented in a network having a plurality of switching elements interconnected with a plurality of processing elements, the method comprising:
generating and outputting monitoring messages across a plurality of paths in the network;
detecting a fault in the network based on the monitoring messages;
determining that the fault is due to one of a cross-connection failure and a shelf interconnection failure;
generating and outputting alert messages across the plurality of paths to trigger the plurality of processing elements to perform recovery from the fault; and
the plurality of processing elements performing a local port Internet protocol (IP) address recovery based on the alert messages.

21. The method of claim 20, further comprising notifying the plurality of processing elements to switch Internet protocol (IP) addresses to a same port side.

22. The method of claim 21, further comprising the plurality of processing elements switching IP addresses to the same port side responsive to the notifying.

* * * * *